(12) United States Patent
Roskowski

(10) Patent No.: US 8,558,888 B2
(45) Date of Patent: Oct. 15, 2013

(54) BANDWIDTH SHAPING CLIENT TO CAPTURE, TRANSFORM, CACHE, AND UPLOAD IMAGES FROM A REMOTE POINT OF RECORDATION TO A NETWORK SERVICE

(75) Inventor: Steven Goddard Roskowski, Los Gatos, CA (US)

(73) Assignee: Third Iris Corp., Grand Cayman (KY)

( * ) Notice: Subject to any disclaimer, the term of this patent is extended or adjusted under 35 U.S.C. 154(b) by 1258 days.

(21) Appl. No.: 12/395,437

(22) Filed: Feb. 27, 2009

(65) Prior Publication Data

US 2009/0219392 A1    Sep. 3, 2009

(51) Int. Cl.
*H04N 7/18*    (2006.01)
(52) U.S. Cl.
USPC .......................................... 348/143; 348/152

(58) Field of Classification Search
USPC .................................................. 348/143, 152
See application file for complete search history.

(56) References Cited

U.S. PATENT DOCUMENTS

| | | | |
|---|---|---|---|
| 6,970,183 B1* | 11/2005 | Monroe | 348/143 |
| 2004/0093409 A1* | 5/2004 | Thompson et al. | 709/224 |
| 2004/0181690 A1* | 9/2004 | Rothermel et al. | 713/201 |
| 2008/0259179 A1* | 10/2008 | Senior et al. | 348/222.1 |
| 2009/0219392 A1* | 9/2009 | Roskowski | 348/143 |
| 2010/0220202 A1* | 9/2010 | Roskowski | 348/211.3 |

\* cited by examiner

*Primary Examiner* — Mohamed Wasel
(74) *Attorney, Agent, or Firm* — Patentry

(57) ABSTRACT

A video surveillance terminal avoids network congestion. The camera lowers exposure to unauthorized operation. Each apparatus discards unviewed higher resolution streams unless expressly desired by a host user. The client of the service determines an event of interest, selects an extent of data to represent the event, and derives a compact representation by video encoding and compression.

9 Claims, 8 Drawing Sheets

BANDWIDTH SHAPING CLIENT TO CAPTURE, TRANSFORM, CACHE, AND UPLOAD IMAGES FROM A REMOTE POINT OF RECORDATION TO A NETWORK SERVICE

BACKGROUND

Security cameras are increasingly important for both enterprises and consumers. All levels of government are promoting installation of cameras to address fears of crime. Liability insurers may raise rates on customers who cannot document that their premises are controlled. But the market is bifurcated into extremely costly high end integrated services and low cost do-it-yourself system design projects for hobbyists. By high complexity image sequences the present invention includes high resolution digital photographs, lower resolution moving images in the form of a series of video frames, meta-data about the time, place, and conditions of the image, and derived data from quantitative metrics of the images and compressed low resolution extracts from images.

Internet Protocol (IP) network digital cameras are known as an accepted solution for security and monitoring. Utilizing IP networks instead of dedicated video connections to a local server dramatically improves system flexibility and can reduce connectivity and management complexity.

Conventional IP network camera system design requires "logging in" to each camera. Typically, each camera implements a website for user access. After a user connects to a camera, he or she may then view data, configure the camera, control conventional camera pan, tilt, and zoom (PTZ) functions, or view a real time stream of image data. In common applications, people also want to record the video to allow an analysis of events either missed in real time or not observed with the necessary attention.

Conventional cameras can be configured to send an email including images when an event happens. Conventional cameras can be configured to broadcast or stream video. Conventional cameras can be configured to perform a file transfer protocol (FTP) transaction, in a non-limiting example, uploading at least one image. While this is closer to a desired end user functionality, conventional implementations require extensive network application and system engineering and only result in transfer of limited amounts of information. For example it is observed by the inventors that configuration of each network environment consists at least of opening ports, mapping addresses, managing a difficult maintenance and operations model to be assured that the system is working when needed, and addressing security concerns. For example, is the equipment on premises vulnerable to theft or damage, can end users properly configure the network and the specific camera device, what steps are needed to easily record and analyze the video.

To allow live access to cameras, a user should be able to configure firewalls if external access is to be allowed and to configure an IP address resolution service such as a dynamic DNS application. Because the solution depends on an occasional user to define and configure each security installation, deployed solutions have been known to exhibit very poor security such as unintended publicly viewable webcams.

It is known that configuring for recording video is even more complex than simply viewing it. The typical solution requires selecting and installing an additional system into the user's local network to record the video, configuring the cameras to transmit incoming data in a manner compatible with the recording system, and assuring all network configurations are correct to allow reliable communication between cameras and recording systems. This introduces additional hardware to be configured and maintained. It creates an additional exposure for assets to be stolen or damaged. Prior to beginning the installation, users must determine how large and complex a system they will ultimately require or some procurement will turn out to be inadequate and soon obsolete.

To utilize outbound FTP functionality, the user of conventional systems must configure a server to accept the FTP transactions and configure the camera to upload the data appropriately. Further, since the FTP transaction is typically not in real time, the size is limited by the amount of memory available for storage on the device. Alternately an email solution can be considered. Unfortunately, e-mail cannot typically provide true video recording. Limitations of email servers and email accounts constrain the email alert model to only a few images. Further, since email does not enable realtime streaming of data to the email server, the total size of the stored video is limited to the storage on the device.

Conventional video security systems do not enable proactive monitoring of their status. End users occasionally discover when an event occurs in their premises, that their system was not functioning correctly and that they do not have the desired critical information despite having made investments into both cameras and recording systems. Since video monitoring systems are typically not core to the business of most enterprises, but supportive, the resources allocated to maintain the system are frequently inadequate, insufficient, or lack the proper expertise to maintain the system effectively. This results in many video systems being effectively turned off after a period of time as the cost and complexity of maintaining the system overwhelms the day to day benefits. Only the largest governmental or private enterprises have continuous human monitoring of all cameras.

The challenge of maintaining operational systems has been addressed in other domains effectively by adopting a "service model" where minimal equipment is onsite and a centralized service provides functionality to a large pool of users. Video monitoring has historically been unable to use this model effectively due to the high bandwidth required to effectively record usable quality video. While this bandwidth can be addressed in local area networks, a service model with centralized recording requires video to be sent over a wide area network such as the Internet, and such connection may be costly and typically limited. For example many business have traditionally had "T1" connectivity, which is bidirectional at about 1 megabit per second. A single camera with high quality video in traditional implementations uses 2-3 megabits of bandwidth, making a conventional service based model impractical.

The benefits of a service based model would be significant. One key benefit is the ability to use shared resources across a larger number of customers. This amortizes the cost of equipment, monitoring and maintenance, allowing very high levels of service at manageable costs. In the area of equipment and management, it is known a single logical storage volume, potentially made up of a very large number of physical volumes, can be shared amongst a large number of users if there are sufficient safeguards for privacy. Using a single large logical storage volume allows for significant individual variance in usage patterns to be efficiently addressed. A single large logical storage volume also allows additional reliability and maintenance investments to be amortized over the entire user set, significantly increasing reliability and reducing costs.

Similarly it is known that a set of processing elements can be efficiently shared amongst a plurality of sporadic processing demands. The virtual machine model is one well known implementation that allows processing to be allocated and de-allocated to processing resources on demand. Several other processing models are known ways of distributing computational demands over a large number of processing elements. The models include pipelining, where a single processing element performs a small part of the overall function for multiple processing demands, and threading, where a single process is divided into multiple logical subprocesses.

These processing and storage models have been optimized in a computational architecture commonly called "cloud computing". In cloud computing a very large number of machines and a very large amount of logical storage is made available in an on-demand basis to a large body of customers. Customers can increase and decrease the amount of computational resources allocated to them on a demand basis. Each computation resource is some version of a virtual machine, which can then be further partitioned into individual user computation needs as outlined above. Cloud computing also provides cloud storage, where a very large amount of storage is made available on a demand basis, allowing customers to allocate and de-allocate storage as needed. One example of cloud computing is Amazon's Elastic Computing Cloud (EC2). One example of cloud storage is Amazon's Simple Storage Service (S3).

The following processes are known in the art as methods for motion detection: processing a constant sequence of images (video), establishing a reference image of the scene with only background items, detecting when pixels are changed sufficiently in subsequent images to indicate areas in motion, counting the number of pixels in motion to determine if enough have changed to indicate an event of interest, and updating the background image for areas that have changed minimally. Significant improvements are known on this basic algorithm including object detection and object recognition. Thus it can be appreciated that what is needed is an apparatus which makes deployment, maintenance, and operation of IP network cameras much less complex. What is needed is equipment that is extremely easy to set up and maintain by using a cloud computing infrastructure and strategy.

SUMMARY OF THE INVENTION

A novel implementation of a security camera, is a Point of Recordation Terminal (PORT) apparatus disclosed as follows. In use, a plurality of point of recordation terminals (PORTs) are distributed among small and medium sized enterprises for installation in their respective private networks. Each PORT captures and analyzes images to determine if there is an event of interest. Events of interest are compressed, formatted and stored to construct an asset. A reference to each asset is transmitted in near real-time comprising a compressed single frame, time, date, meta-data associated with the assets not transmitted and identity of the terminal. The reference provides sufficient information to uniquely access the associated asset on the specific PORT. The PORT provides a mechanism for a Point of Analysis (POA) apparatus to access the associated asset at a later time if desired.

The method for defining an event of interest results in identification of a sequence of images which span the event of interest. In an embodiment the sequence of images is compressed with a video compressor circuit to create the video asset. In an embodiment, some images can be stored in anticipation of the beginning of a event of interest, keeping a constant record of the last several images. This sequence of images is provided to the compression circuit before the images associated with the event of interest, providing a short "preroll" of video of the images leading up to the event of interest. In an embodiment, the sequence of images provided to the compressor circuit can be continued after the end of the event of interest to provide a "postroll" of video of images after the event of interest.

The PORT comprises a bandwidth controller circuit which regulates the archiving, purging and transmission of assets and references under direction of a plurality of policies. Policies are selected based on a plurality of conditions including PORT application, date and time, configured bandwidth utilization, PORT status, and network connectivity status. A mechanism is provided to allow the POA to change policies and policy selection criteria. The PORT contains unique identification information to allow it to be securely and unquestionably associated with certain resources on the POA. The PORT also comprises a means for encrypting and signing assets and references independent of data transport allowing a POA to securely maintain the uploaded content and to validate with a high degree of confidence the providence of the assets transmitted from the PORT.

The PORT comprises means for automatically determining its network environment and contacting the POA with minimal or no user configuration. The PORT utilizes only data connection initiated by the PORT to a known location for the POA to function in any local network without user configuration of the PORT or the local network environment. One means is a processor controlled by software to perform network exploration and self-configuration as disclosed below.

DETAILED DESCRIPTION OF EMBODIMENTS

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

In embodiments of the invention there are circuits for encrypting video frames at the point of recordation terminal (PORT) apparatus. In an embodiment references, assets, or both are encrypted before storage. In an embodiment references, assets, or both are encrypted before transmission through a public network.

Figure 1:
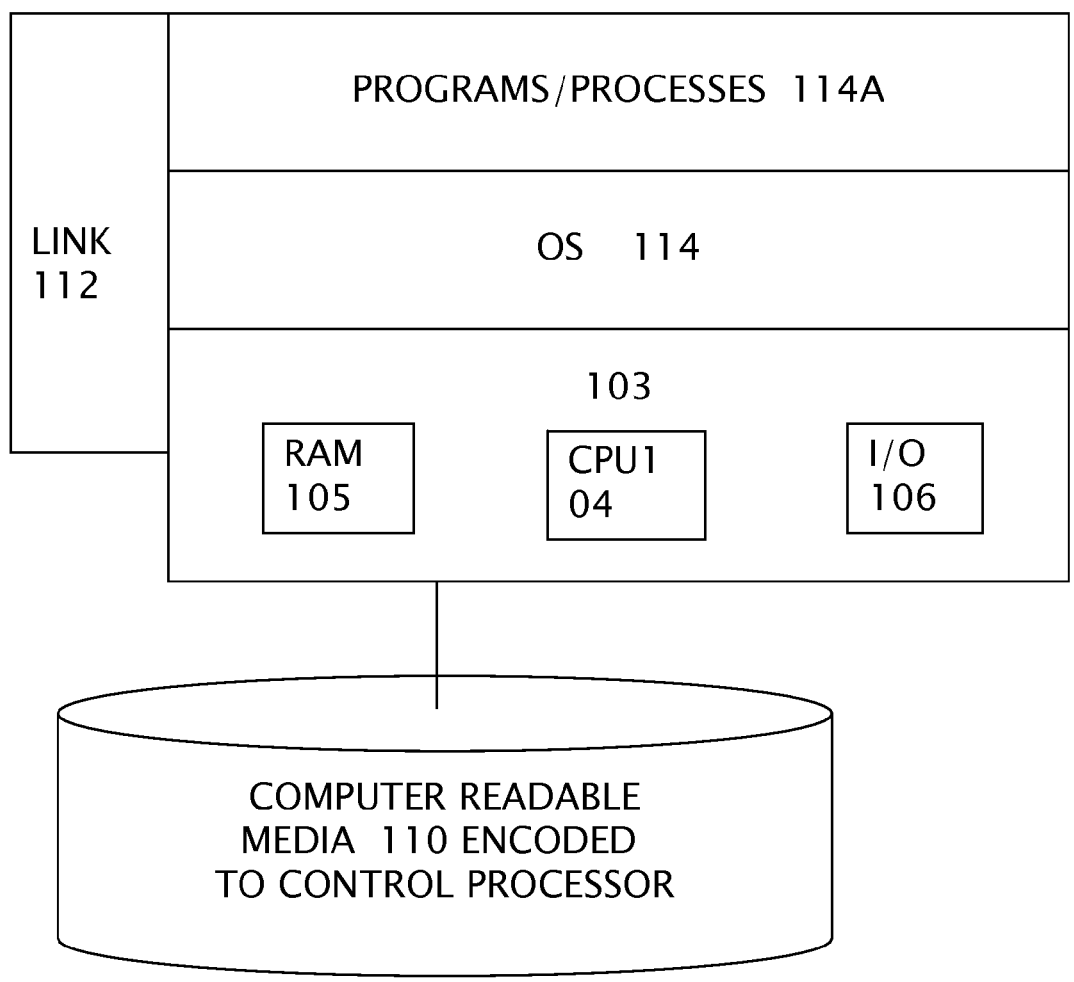
FIG. 1 is a processor adapted to perform as a circuit according to the present invention.

FIG. 1 shows a block diagram of a typical computing apparatus 100 where the preferred embodiment of this invention can be practiced. The computer apparatus 100 includes a computer platform having a hardware unit 103, that implements the methods disclosed below. The hardware unit 103 typically includes one or more central processing units (CPUs) 104, a memory 105 that may include a random access memory (RAM), and an input/output (I/O) interface 106. Various peripheral components such as a camera may be connected to the computer platform 102. Typically provided peripheral components include a data storage device (e.g. flash, or disk) 110 where the policies and images used by the preferred embodiment is stored. A link 112 provides access to the global Internet. An operating system (OS) 114 coordinates the operation of the various components of the computer system 100, and is also responsible for managing various objects and files, and for recording certain information regarding same. Lying above the OS 114 is a software layer 114A. The user layer 114A runs above the operating system and enables the execution of programs using the methods known to the art and is where most processing as described typically occurs.

An example of a suitable CPU is a Xeon™ processor (trademark of the Intel Corporation); examples of an operating systems is Wind River RTOS. Those skilled in the art will realize that one could substitute other examples of computing systems, processors, operating systems and tools for those mentioned above. As such, the teachings of this invention are not to be construed to be limited in any way to the specific architecture and components depicted in FIG. 1.

Figure 2:
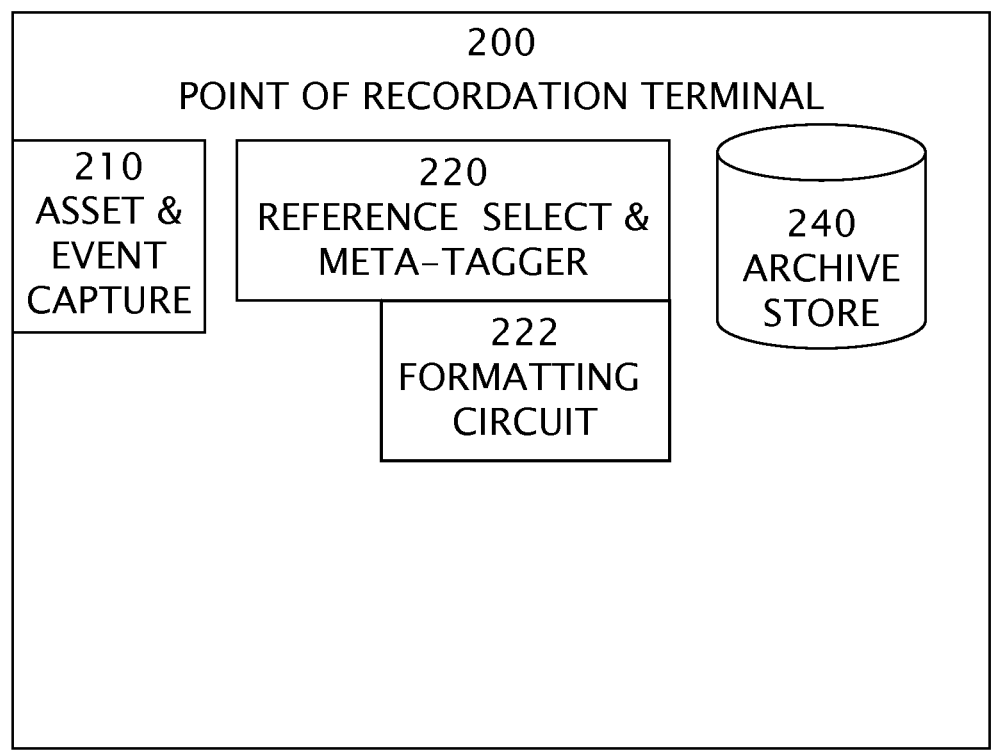
FIG. 2-8 are block diagrams of a point of recordation terminal embodiments.

Referring further to the drawings, FIG. 2 is a block diagram of a point of recordation terminal apparatus. A point of recordation terminal apparatus 200 comprises an asset & event capture circuit 210 comprising a high resolution digital camera, a video encoding & compression circuit, and an image encoding & compression circuit; the asset & event capture circuit coupled to a reference selection & meta-tagger circuit 220 and the reference selection and meta-tagger circuit couples to a formatting circuit 222 and further coupled to an asset and reference archive store 240. When it has been determined that the asset capture circuit has detected an event of interest, an asset is initiated and processed as directed by the appropriate policy, normally storing into an archive. As the asset is being generated, a reference is composed by selecting a representative frame of the video to scale and compress, recording the beginning of the event of interest, and accumulating relevant metadata about the generated assets. A processor controlled by computer-readable instructions to perform steps of the present invention is one means for circuits disclosed in this disclosure. In an embodiment, a video encoding and compression circuit is a h.264 encoding circuit. In an embodiment an image encoding and compression circuit is a JPEG encoding circuit.

Figure 3:
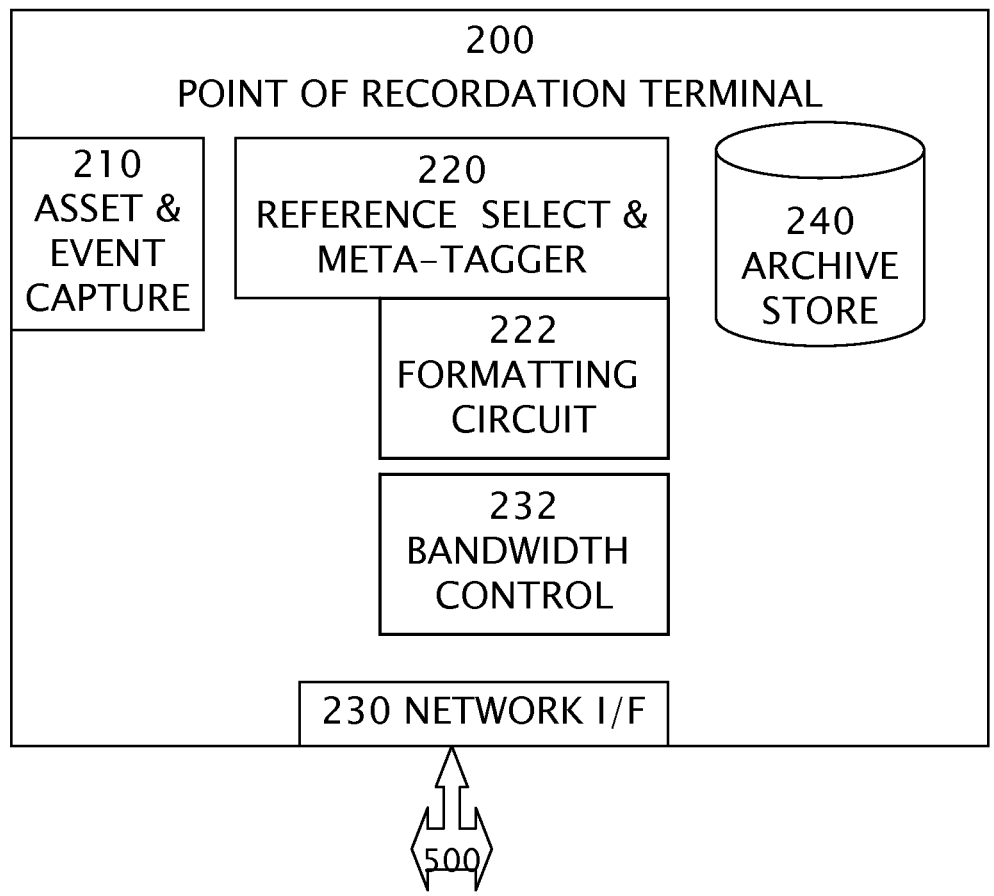

Referring to FIG. 3, at least one point of recordation terminal 200 is coupled to a network 501 through its network interface 230. In an embodiment, the network is a private network. In an embodiment, the network is a wireless cellular network. In an embodiment of the present invention, an apparatus comprises a point of recordation terminal 200 comprising a network interface 230, the network interface coupled to a network 500.

Figure 4:
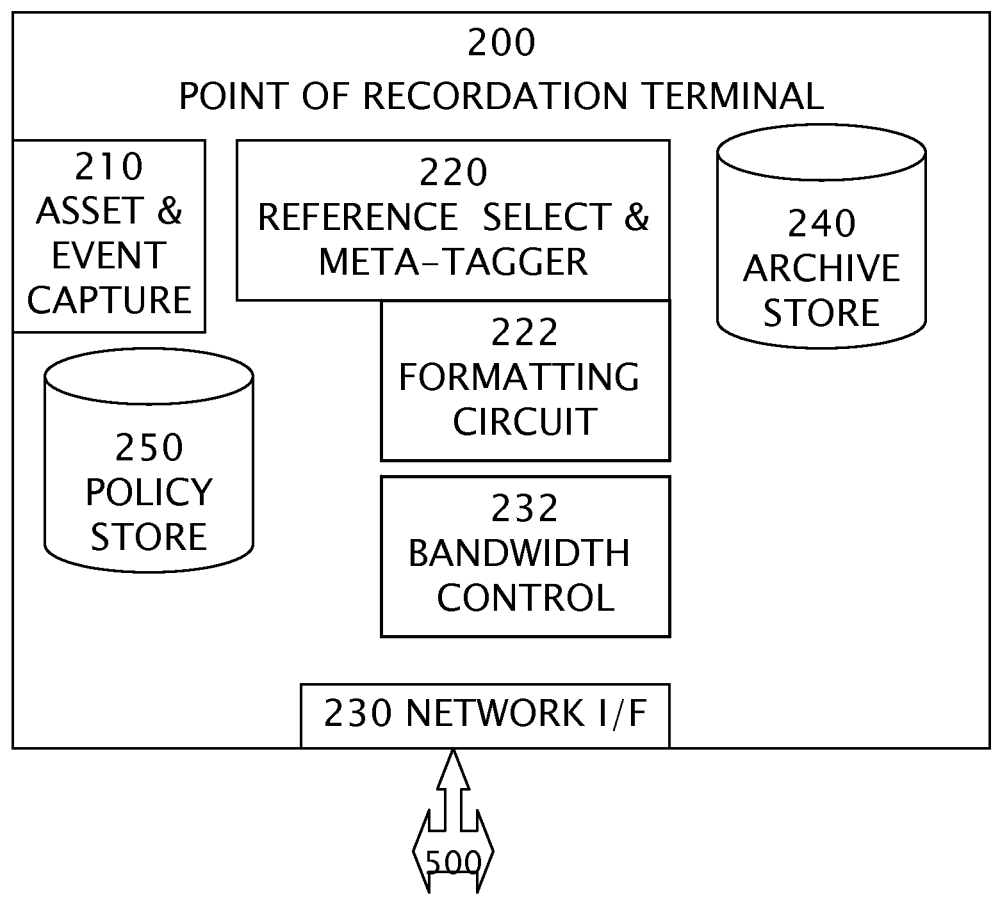

Referring to FIG. 4 The present invention is distinguished by executing policies stored in policy store 250 in a bandwidth controller circuit 232 to support and mutually benefit the methods of operating a wireless cellular network. Combined with identity information for the specific PORT, as directed by policy, the reference is transmitted through the network interface 230. Policies also control what is determined to be an event and control the formatting circuit and control the bandwidth assigned.

Figure 5:
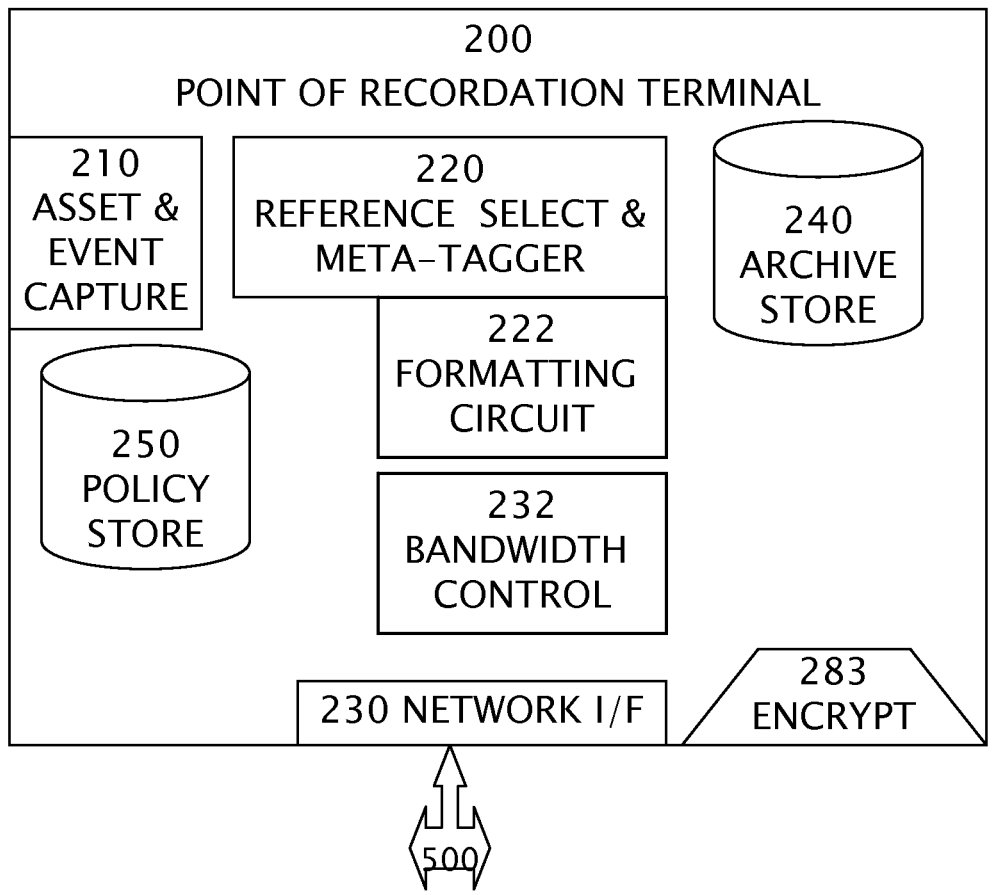

Referring to FIG. 5, in an embodiment of the invention, references and assets are encrypted. In an embodiment assets and references are encrypted using a key in encryptor circuit 283 before transmission through the network interface 230. In an embodiment, assets and references are encrypted within the point of recordation terminal 200 prior to archive store. By using encryption circuits, a public network 500 can be used to lower the cost of providing these services. By using strong encryption keys with the assets and references, the resulting artifacts can be safely stored in environments with potential security flaws such as cloud services.

The encryption attached to the assets and reference clearly distinguishes the present invention from conventional systems which use transport level security. Once files have completed transport in a conventional system they can be read by anyone representing a continuing loss of privacy for as long as they are stored. In contrast the encrypted assets and references are stored in encrypted format and may never be decrypted at all before expiration. Because encryption securely associates the asset with the device and time of creation, there is provenance for the assets and references. In an embodiment, each unit has a unique private key of a key pair. It is known that a digital signature can establish the source of an image is a specific camera. This can be distinguished from conventional transport level security which does not provide provenance back to the specific PORT and time of the event of interest, and creates a security vulnerability as assets are processed and typically stored in a decrypted format.

Figure 6:
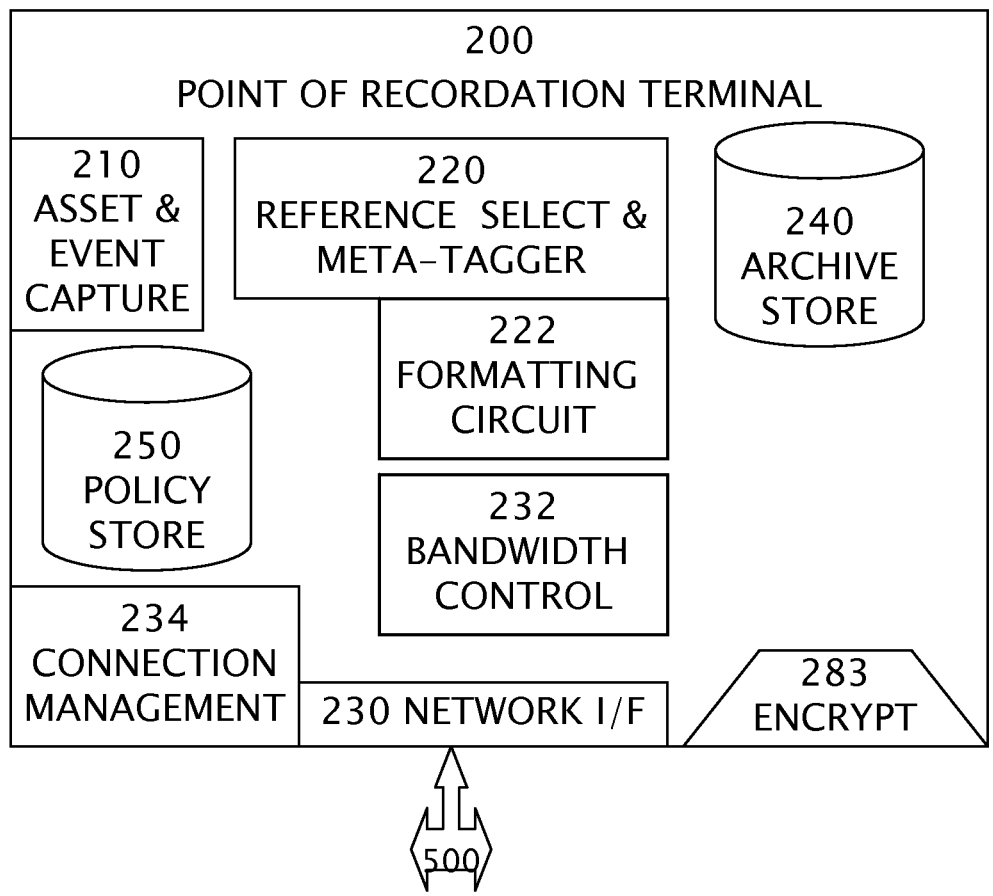

Referring to FIG. 6, a method of operating the present invention during outage comprises the steps of the connection manager 234 determining from signals of the network interface that the network is congested or defective, selecting a policy defined for handling assets and references, the policy to control:

storing references from the reference selection & meta-tagger circuit 220 into the archive store 240, storing assets into the archive store 240 if there is available capacity, discarding stale assets in the archive store and storing new assets into the archive store, discarding new assets if it determines that there is no capacity, discarding new references if it determines that there is no capacity, and testing for restoration of network connectivity and improved bandwidth.

Referring to FIG. 6, the present invention comprises a method for operating an embodiment for recovery after network outage or congestion. In an embodiment, references are stored in the archive store 240 during network outage or congestion as controlled by the bandwidth controller 232. In a non-limiting example, network congestion or outage could cause low or no bandwidth while the PORT 200 is itself operating and detecting events. When the method determines that the outage is ended or that bandwidth constraints have loosened, a new policy is selected, which directs that references which have been queued in archive 240 be transmitted immediately with no bandwidth restrictions.

Figure 7:
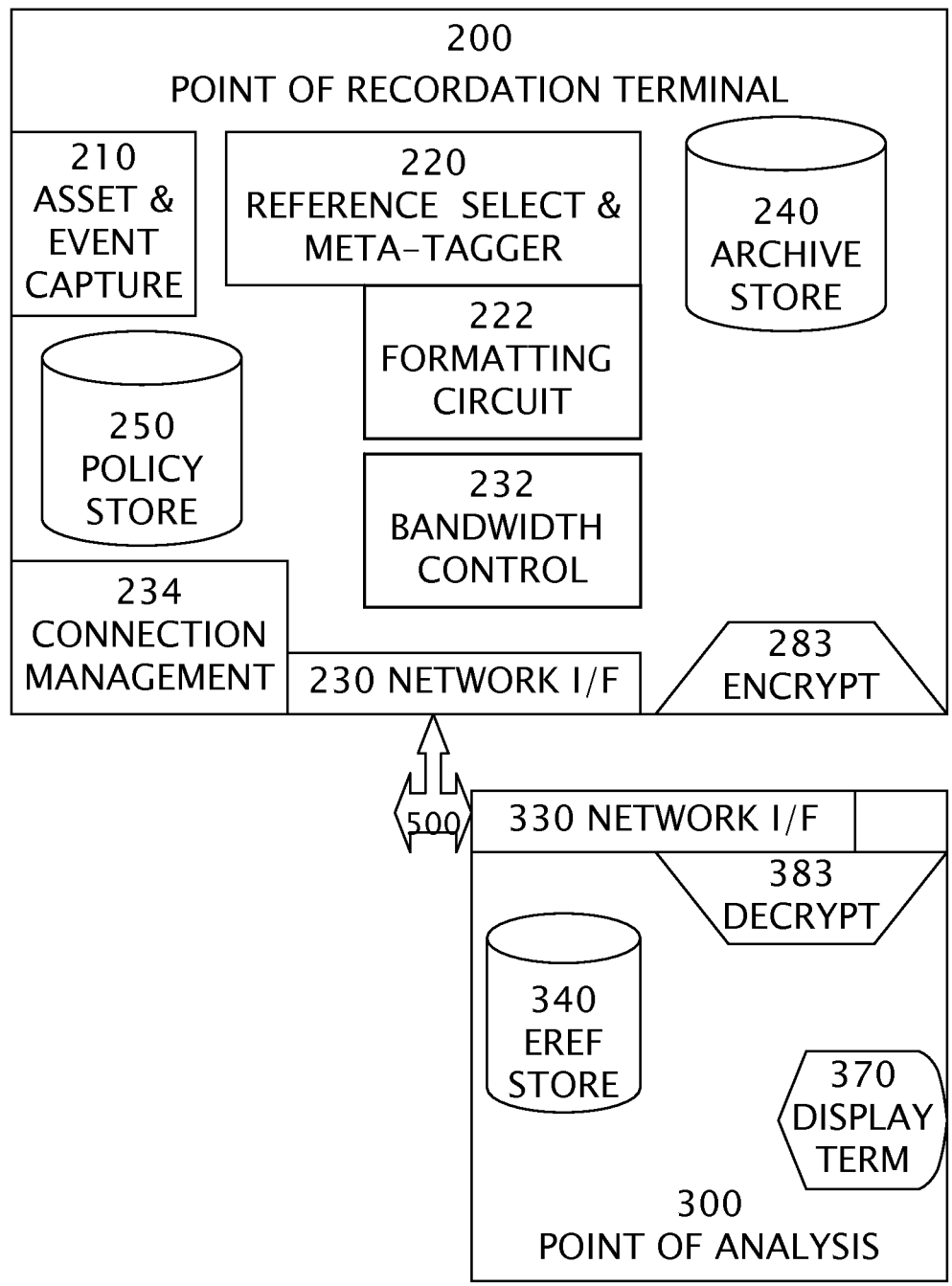

Referring to FIG. 7, in normal, unattended operation the operation of a specific PORT apparatus 200 is as follows: as an assets and event capture circuit processes a plurality of images frames and determines if an event of interest is in progress, a policy based bandwidth controller circuit 232 selects the normal policy which directs it to store assets in the archive store 240 and transmit references immediately over the network interface 230 to connected network 500 to the designated POA.

Figure 8:
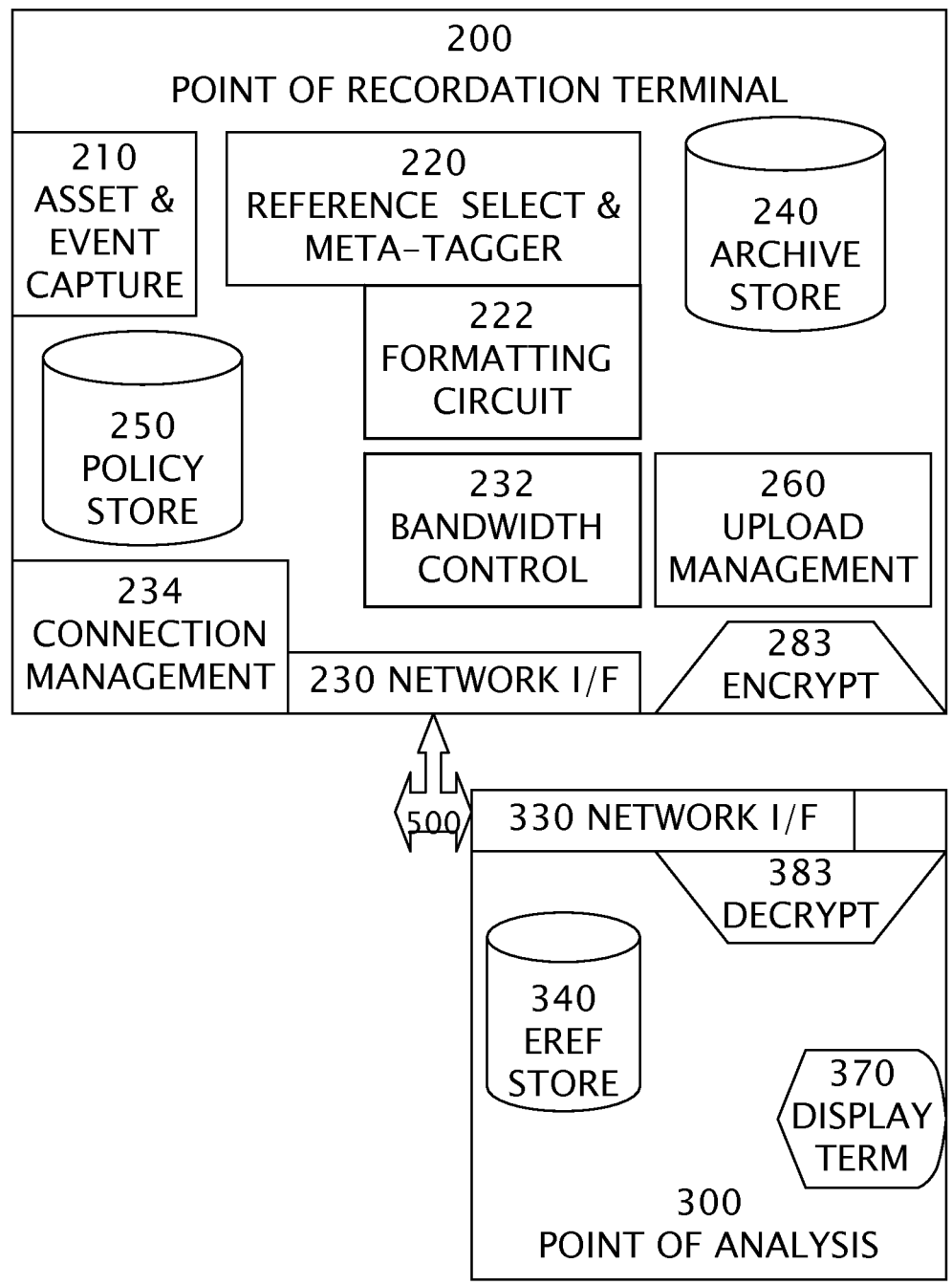

Referring to FIG. 8, while processing, the upload manager 260 monitors the status of other elements, in an embodiment including archive store 240 to determine if it is nearing capacity and network interface 230 to determine if it is functioning correctly, and selects alternate processing policies for process assets according to the determined state. Alternate policies for archive store nearing capacity include deleting old assets, deleting selected old assets types (video, high resolution snapshots), and not storing new assets. Alternate policies for network connectivity are outlined earlier.

If connectivity between a point of recordation terminal and the network is lost or degraded, but the PORT is otherwise functional, it selects a different policy to guide storage and of assets and references.

In an alternative operating mode, the bandwidth controller is configured with a policy so that the PORT transmits assets and references as they occur. By storing a copy of the transmitted data while the transmission is occurring, the PORT can provide recovery of data in the event a transmission is determined to be unsuccessful while the transmission is occurring. When the transmission failure is detected, the remaining portions of the assets and references are generated as normal but not transmitted. When network connectivity is restored, recovery can be accomplished as above.

In an embodiment, a POA 300 may request a live feed from a specified PORT 200. A live feed is differentiated from the asset and reference model in that no event of interest is necessarily involved. Instead the PORT artificially forces an event of interest to be created independent of the content of the images. The artificial event of interest has a reference image, typically determined by taking the first image in the sequence. Similarly, the other aspects of the event of interest are created independent of the data. If an event of interest does occur during the sequence of images created by the live stream, it is handled as described in multiple events of interest below. The PORT apparatus responds to the request for live streaming by selecting an appropriate policy, which typically directs the bandwidth controller to allow unlimited transfer of live asset information to the network interface 230, passing the processed video information (encoded, formatted, and encrypted) directly to the network interface as it is generated, and indicating to the reference generation circuit that an artificial event is in progress.

In an embodiment a PORT includes a connection management circuit 234 for interacting with the POA outside of the upload of assets and references. The connection manager establishes an outbound connection to the POA to allow the PORT to function without requiring any inbound connections. Amongst other things, the connection manager is used to download and modify policies for the bandwidth controller. The connection manager also allows the POA to request the immediate upload of a specific stored asset. The PORT responds to this request by immediately transmitting the requested asset under a specific policy, typically no bandwidth constraints.

It is understood that a network may be a private network, a local area network, a public network, or a combination of the above such as the internet. Further, the network may be a wireless local network, a wireless cellular network, or a wired network. The invention is specifically distinguished in its ability to function with relatively low bandwidth and unreliable connections, as typically required for wide area networks, either wired or not. Each point of recordation terminal 200 is also coupled to the network by a network interface 230. It is further understood that a network in the present patent application is defined to include proxies, pass-throughs, and other elements which do not change interface modality.

A point of recordation terminal further comprises an asset & event capture circuit 210, a reference selection and meta-tagger circuit 220, and an archive store 240, the asset & event capture circuit coupled to the reference selection & meta-tagger circuit, the network interface 230 coupled to the reference selection & meta tagger circuit and coupled to the archive store.

A PORT further comprises a connection management circuit 234 coupled to the network interface 230. The connection management circuit establishes a connection to allow configuration and management of the PORT. Because the connection management circuit and the transmission circuit disclosed below both utilize a connection initiated from the PORT to the POA, they are compatible with typical network configurations such as NATs (network address translators, which fake a public IP address for a local network device with a private IP address) and Firewalls (which typically restrict almost all inbound traffic but little if any outbound transactions). In an embodiment, the connection is an HTTP request initiated by the PORT which is periodically timed out and re-initiated. If the POA has a configuration directive for the specific PORT in question, it responds to the HTTP request with the contents of the directive. Subsequent requests from the PORT provide the status and results of the configuration directive. Upon reception of the configuration directive, the PORT executes the command and re-initiates the connection. In an embodiment, the PORT executes directives with an extend duration by creating a separate process or thread to process the command, while re-establishing and maintaining the connection to the POA, and including in the connection the status of the commands currently executing. In an embodiment, when a directive finishes, the HTTP connection is immediately terminated and re-established with the final status of the directive, providing immediate feedback of directive completion.

An embodiment of the invention is a method comprising the processes of: determining if motion has occurred, defined as an event of interest, defining a small single image to represent the event of interest in a time correlated manner, locally imaging data at all times at all cameras, determining if locally analyzed images are not needed, not recording or transmitting except for minimal statistics information.

An embodiment of the invention is a process for recognizing an event of interest and storing an asset and at least one reference to associate as exemplary of the event. The process comprises known methods for motion detection, known methods for object detection, and known methods for object recognition and the following steps: triggering on matching an event of interest pattern within a certain sequence of images, selecting an exemplary image from the sequence, scaling the exemplary image, compressing the exemplary image, recording the start and end times of the event of interest, and additional metadata sufficient to efficiently process and uniquely address the associated asset on the PORT. In an embodiment, an exemplary image is selected from the sequence of images in motion as the image with the largest pixel difference from a reference image in the sequence. In an embodiment of the method, the method further comprises operating on the event of interest to generate a high resolution image asset, In an embodiment of the method, the method further comprises operating on the event of interest to create a very compact image representative. By operating on the event of interest is included the non-limiting examples of no scaling and compression, scaling and compressing in a highly lossy manner, and JPEG encoding. In an embodiment, the method further comprises the step of recording additional metadata derived from the event of interest, by computing the amount of motion detected on each frame and an indication of the current logical mode of the motion detection circuit, including preroll, motion, and postroll. In an embodiment the method further comprises creating reference information for an asset to facilitate the processing or retrieval of assets, in an embodiment the asset size in bytes.

It can be appreciated that the operation on an event of interest described is in anticipation of the POA providing primarily a direct user interface to allow humans to rapidly select events of interest for further analysis. In anticipated implementations of a PORT alternative reference and asset information will be captured to allow efficient computation processing of references to determine if an event of interest requires further analysis, and subsequent processing of the associated assets. Specifically, is known that object recognition algorithms can identify the type of object (such as car, person, face) being imaged and its location. Further it is known additional artifacts can be produced from such object recognition processing, such as the specific features and their spatial relationship. In support of a POA doing object processing, a reference would contain limited categorization information and the reference would contain the detailed object features. Thus the PORT architecture of references and assets should not be constrained to the specific type of references and assets disclosed.

In an embodiment of the invention, the PORT further comprises an asset upload manager circuit. The upload manager circuit functions under a selected policy to send assets to the POA without request from the POA. In anticipation of the POA needing a significant percentage of the assets, and in acknowledgement that a PORT must have limited archive capacity, the upload manager attempts to send assets proactively to the bandwidth controller 232 for transmission. The bandwidth controller selects a policy appropriate for the background upload of assets (typically a significantly limited bandwidth allocation) and sends the assets at or below the defined rate. The upload manager also tracks the status of reference and assets in the archive, and under policy control can immediately delete references and assets once they have been transmitted, delete them when the archives near capacity, or not delete selected or all assets. In practice, the events of interest occur infrequently and have limited duration, the background transmission of assets can be accomplished in a small fraction of the bandwidth required for transmitting the data in real-time. The upload manager policy can be selected based on conditions including the current status of the archive store, and the time of day and day of the week. Policies for the upload manager include sending all assets in order of storage, sending assets in reverse order of storage, and sending selected types of assets first, followed by different type of assets. In an embodiment, an upload manager circuit comprises a processor coupled to a policy store, the policy store comprising computer readable media encoded with instructions to adapt the processor to perform the above disclosed steps and processes. The policy store is further coupled to the connection manager whereby the contents of the policy store can be initially configured and updated.

The present invention comprises a computer implemented method for archive transmittal containing the steps of storing assets locally to the PORT, tracing assets through a common ID in reference data to allow an arbitrary delay between capture and upload of the asset, limited only by the storage available in the PORT. As the bandwidth controller determines that bandwidth is underutilized, assets are transmitted using the established reference information to allow a POA to associate the assets uploaded in the this background manner with the originating reference data. A policy guides but does not dictate the operation of the bandwidth controller. In an embodiment, a policy assigns bandwidth by time of day and day of week. In an embodiment, the policy assigns bandwidth during network failures by defining the amount of time to wait in response to a network failure before attempting transmission of a stored asset. In an embodiment, the bandwidth controller may autonomously adapt the policy to use more bandwidth if the asset store is becoming full.

In an embodiment of an apparatus for documenting at least one occurrence of an event of interest the apparatus comprises a digital camera coupled to a network interface, the camera, and the network interface coupled to the following:

a means for determining when an event of interest occurs, in an embodiment a circuit comprising a processor controlled by software to execute the following computer-implemented steps: motion threshold, and a means for selecting an extent of data associated with the event of interest to accurately represent the event, in an embodiment a circuit comprising a processor controlled by software to execute the following computer-implemented steps: marking motion activity plus a preroll and postroll, motion object tracking with analysis artifacts;

a means for efficiently recording the selected extent of data in an embodiment a circuit comprising a processor controlled by software to execute at least one of the following computer-implemented steps: to h264 encode, to JPEG encode;

a means for storing the recorded events in an embodiment a circuit comprising a processor controlled by software to execute the following computer-implemented steps: to write to flash memory, to write to SD-card, SDXC-card, SDHC-card or equivalent non-volatile memory card, to write to disk; and a means for deriving more compact representations of the event which can assist in determining if the event is of further interest, in an embodiment a circuit comprising a processor controlled by software to execute the following computer-implemented steps: to generate highly compressed images, timestamps, motion metadata, and descriptive information for each asset.

In an embodiment, a means for determining when an event of interest occurs in an embodiment a circuit comprises a processor controlled by software to execute the following computer-implemented steps: to determine if multiple events of interest occur in close proximity, to cause a single extent of data to be recorded indicative of multiple event representations, each of which provide indication of where in the extent the event occurred. In an embodiment, if during an event of interest or during the postroll period after an event of interest, a new event of interest is determined to occur, a new set of reference data and image asset data is generated, and the sequence of images captured is continued to included the subsequent event of interest. The reference data and assets have an offset associated with them to indicate at which number in the sequence of images represented by the compressed video they occur.

In an embodiment, a means for storing recorded events and a means for deriving compact representations comprises a circuit comprising a processor controlled by software to execute the following computer-implemented steps: to encrypt data for later decryption In an embodiment a means for storing the recorded events comprises in an embodiment a circuit comprising a processor controlled by software to execute the following computer-implemented steps: to store them locally on the device and to transmit according to a policy implemented in a bandwidth controller circuit.

In an embodiment an apparatus for transmitting compact representations of an event of interest over an unreliable network comprises, a means for connection comprising at least one of a private network, an IP network, a cellular network, or an IP network over cellular network;

the means for connection coupled to a first network interface circuit and to a second network interface circuit, the first network interface circuit coupled to a means for transmission of compact representations, wherein the means for transmission of compact representations comprises in an embodiment a circuit comprising a processor controlled by software to execute the following computer-implemented steps: to determine if the representation cannot be immediately transmitted, to store the representations locally and to retry transmission at a later time; and a means for reception coupled to the second network interface, A PORT comprises a transmission circuit which transmits data to a POA. In an embodiment, the PORT transmission circuit is a processor adapted by a software implementation of the HTTP protocol, which initiates a separate transaction for uploading each set of references and assets associated with a event of interest. In an embodiment for streaming, the PORT transmission circuit is adapted to perform the method of the HTTP chunked data transmission model which incrementally transfers large media assets as they are generated. In an embodiment, the PORT transmission circuit maintains a record of data transmitted but not acknowledged by the protocol, and in the event the HTTP transaction fails to complete correctly, the information can be stored in the local archive for later recovery.

In an embodiment, a PORT further comprises a formatting circuit which processes the compressed video to a format that allows streaming without reformatting as well as storage (RTP based protocols allow streaming, MPEG 4 allow storage but not both). In an embodiment the video is formatted in the flash FLV format for H.264 video. In an embodiment, a formatting circuit of the PORT couples to the archive store and to a bandwidth controller and to a policy store to interpret a standard H.264 bit stream or reference format and convert the data stream directly into the FLV format while adding minimal (less than a frame) of latency.

In an embodiment, a PORT further comprises a video encoder circuit which runs constantly, to generate a valid H.264 video stream. In an embodiment, a PORT further comprises a formatting circuit coupled to a video encoder circuit to detect reference or key frames (I Frames in H.264 nomenclature) and always starts video sequences at I Frame boundaries. In an embodiment, a PORT further comprises a transmission circuit which stores a sequence of compressed video frames starting with an I Frame as a preroll buffer, enabling preroll buffering in the compressed space, significantly reducing the storage required for preroll.

In an embodiment a point of recordation terminal comprises a circuit comprising a processor controlled by software to execute at least one of the following computer-implemented steps:
  to change configuration of other circuits in the terminal,
  to transmit immediately when directed by means for analysis,
  to store events if immediate transmission fails, and
  to specify all data should be recorded and transmitted immediately for a limited period.

In an embodiment the invention comprises a method for operating an apparatus to reliably represent high complexity continuous data over a low bandwidth and unreliable connection, the apparatus comprising:
  a point of recordation terminal (PORT) coupled to a connection,
  the connection comprising at least one of an IP network, a cellular network, and an IP over cellular network, the method comprises capturing, and transmitting an event of interest, wherein capturing an event of interest comprises the following processes:
  determining when an event of interest occurs,
  selecting an extent of data associated with the event of interest,
  efficiently recording the selected extent of data,
  deriving a compact representation of the event of interest, and
  storing the recorded events;

wherein transmitting an event of interest comprises the following processes:
  transmitting immediately when directed and storing if immediate transmission fails,
  opening an client session to a server at a designated address
  transmitting data over the session,
  maintaining a record of data transmitted but not acknowledged,
  recording the record of data in the event the transmission session fails
  storing recorded events locally and transmitting when an acceptable amount of bandwidth becomes available, and
  responding to subsequent request to immediately transmit a stored record by transmitting the data rapidly.

In an embodiment a point of recordation terminal apparatus comprises:
  a high resolution digital camera,
  a first storage device,
  a first network interface,
  a circuit controlled by software to signal a motion threshold,
  a circuit controlled by software to measure motion activity,
  a circuit controlled by software to track motion objects with analysis artifacts,
  a circuit controlled by software to encode h.264 format files,
  a circuit controlled by software to encode JPEG files,
  a circuit to write to flash memories (as non-limiting example an SD card),
  a circuit to generate small reference images, timestamps, motion and asset meta-data,
  a circuit controlled by software to determine if multiple events of interest occur in close proximity,
  a circuit controlled by software to cause a single extent of data to be recorded indicative of multiple event representations and where they occur,
  a circuit controlled by software to store assets locally on the first storage device and to retry transmission at a later time wherein
  a circuit comprises a processor controlled by software instructions and the processor is coupled to the first network interface, the processor is coupled to the first storage device, and the processor is coupled to the high resolution digital camera.

In an embodiment of the invention, a PORT further comprises a policy store, the policy store coupled to the connection manager, a formatting circuit, the formatting circuit coupled to the policy store, to the archive store, to the upload manager, and to the bandwidth controller and to the video encoding circuit. In an embodiment of the invention, a PORT further comprises an upload manager circuit coupled to the archive store and to the policy store, and to the bandwidth controller. In an embodiment of the invention, a PORT further comprises a connection manager coupled to a policy store and coupled to the network interface.

In embodiments of the invention, a PORT further comprises at least one of a policy store, a connection manager, a formatting circuit, and an upload manager. The policy store is coupled to the connection manager, the formatting circuit, the upload manager, the bandwidth controller, and the asset and event capture circuit. The formatting circuit is further coupled to the video encoding circuit, to the archive store, to the bandwidth controller. The upload manager circuit is further coupled to the archive store, and to the bandwidth controller. The connection manager is further coupled to the bandwidth controller and to the network interface. Therefore, policies which determine actions upon certain conditions are received from the network by the connection manager and stored to the policy store whereby the upload manager circuit determines which and how quickly assets are transmitted via the bandwidth controller and the network interface, whereby the formatting circuit determines how to convert raw video to streamable video and how to determine the preroll and post roll parameters, whereby the connection manager changes the operating mode upon certain conditions specified in a policy stored in the policy store.

In an embodiment, a PORT provides metadata captured outside of events of interest which represents the basic inputs to the event of interest determining circuit. In an embodiment a PORT periodically uploads this information as it is generated. The upload of this information allows a POA to analyze the PORT configuration to determine if some other configuration would better capture appropriate events of interest. The periodic upload allows the POA to determine the basic operational status of a connected PORT.

A bandwidth controller circuit executes a first bandwidth management policy for the upload of references and a second bandwidth management policy for the upload of assets. Different modes distinguish "real time" and the recovery mode. The bandwidth controller circuit implements retention policies for both on camera assets, and on camera references. In an embodiment, if a camera runs out of space, the bandwidth controller circuit determines what to throw away (in an embodiment it throws away complete asset sets for oldest events), but it can do other things—throwing away "snapshots" but keeping the video for example.

In an embodiment a bandwidth controller is set to one of several policies in the event of losing network connectivity, such as the non-limiting exemplary policies: storing for recovery and just discarding. A service provider offers additional capacity at incremental pricing. In an embodiment the PORT self regulates its uploading of an asset according to its embedded policy. In an embodiment a server removes bandwidth limitation for a specific asset (and no other transfer) and demands that asset be uploaded without delay. Accordingly, the PORT records such a demand upload and removes it from the queue of assets remaining.

In an embodiment, a PORT receives a policy conditioned on whether a camera has storage available and on whether services have been selected for subscription. Specifically an SD card slot in the camera enables bandwidth shaping. In an embodiment data on the SD card is independently available without decryption. In an embodiment data on the card is stored encrypted.

In an embodiment, the bandwidth controller is a processor controlled by software for policy management for to determine when to upload and how much. In an embodiment it utilizes time-of-day (e.g. don't contend for internet connection when customers are using wi-fi service, but change bandwidth limits after midnight). In an embodiment it utilizes reliability measurements (if packet loss on the link exceeds a threshold, back off sending for a random or fixed time amount to reduce contention). In an embodiment the bandwidth controller circuit utilizes pricing models to determine when to upload and how much (e.g. if unlimited connectivity on my wireless plan after 7, only send references then). In an embodiment, a set of PORTs are organized as a group and bandwidth policy is managed among the group.

An apparatus for generating and storing an asset comprises a digital camera coupled to video memory, the memory coupled to an archive store such as a removable SD flash memory card, and a processor coupled to all the above and to a network interface card.

One means for reading and encoding a camera identification is a processor encoded with a PrettyGoodPrivacy strong encryption algorithm and a private key. One means for reading and encoding a time of day of the asset is reading Unix time from an internet server at the time the first video frame is captured by a digital camera attached to a processor. One means for selecting and storing at least one high resolution digital photograph is a motion detection circuit coupled to a memory configured as a pipeline coupled to a digital camera. Another means is comparing each digital camera frame to a reference frame and capturing a frame having a number of pixels above a threshold different from the reference frame. One means for deriving and storing a medium resolution video image sequence is a jpeg or mpeg chip coupled to a video memory and writing to a flash memory. One means for reading and encoding at least one offset of at least one high resolution digital photograph relative to the time of day of the asset is subtracting the time of the start of the asset from the time at the threshold crossing frame.

The apparatus comprises a circuit coupled to a video memory and writing an asset to a flash memory wherein the asset is an encrypted digital file.

One means for determining and encoding a type of event is reading from the threshold circuit comparing a reference frame to a video frame the parameters of difference. One means for computing and storing a digital signature is encoding a processor with a PrettyGoodPrivacy algorithm and combining a private key, the time of day of the asset, and the size of the asset or reference. One means for determining and storing a preroll before the start of the event is counting the stages of a pipeline memory from the entrance until the point that an event has been determined. One means for determining and storing a postroll after the end of the event is adding a fixed value to the time of the end of the event.

The apparatus comprises a processor adapted to read a video memory and generate a reference which is an encrypted digital file.

One means for deriving a low resolution, scaled still image is encoding a processor with a JPEG algorithm, reducing the scale of a photograph to less than 100×100 pixels, and setting the JPEG algorithm to low resolution. One means for reading and storing a size of the asset is instructing a processor to read the file header from the flash memory controller.

One means for deriving meta-data values includes a processor reading output values from a circuit for graphics processing coupled to a video memory.

Said means comprises a circuit comprising a processor coupled to computer-readable media encoded with instructions for computing meta-data values, determining the size of an asset, determining an event, selecting a high resolution digital photograph from an image sequence, converting an image sequence into a medium resolution video image sequence, deriving a compressed, scaled, low resolution representation from a selected high resolution digital photograph, reading camera identification and computing a digital signature, wherein a reference comprises a plurality of digital files encoded by strong encryption.

Means for reading and encoding a PORT identification include a processor encoded to perform a digital signature on an encoded image using a private key unique to the PORT.

Means for generating a PORT unique identification for the asset include a processor encoded to
increment an event number, or
encode the time and date of the event.

Means for generating multiple representations of the event include a processor encoded to:
include an encoded video representation of an image sequence representative of the event,
wherein an image sequence representative of an event includes images from immediately before the event of interest,
wherein an image sequence includes image from immediately after the event of interest;
to indicate the relative activity detected in each image of the sequence;
to include data derived from analysis of the event of interest;
to include an encoded high resolution image of an image representative of the event;
to reference two grouping of representations, one optimized for minimizing the number of bytes required and one optimized to accurately represent the event of interest;
to identify two groups associated by the unique identifier,
wherein one of the two groups provides indication of the exact representations in the available in accurate representation,
wherein one of the two groups includes size, relationship, and type indication; and
to combine representations into a single larger group if two events of interest occur sufficiently close in time that events immediately before or after would overlap.

Means for indicating the timing relationship between different representations include a processor encoded to:
record the sequence number of the image from the start of the representation, or
record the time and data of the representation.

An apparatus is disclosed comprising a digital camera coupled to a formatting circuit coupled to an encryption circuit coupled to an archive store, wherein the encryption circuit comprises an input for reading a unique camera identification key, an input for reading a video stream from the formatting circuit, a processor for encoding the video stream with time, date, and the unique camera identification key, and an output for writing the resultant encoded video stream to the archive store.

An apparatus is disclosed comprising a digital camera coupled to a reference select & meta-tagger circuit coupled to a formatting circuit coupled to a connection manager circuit coupled to a network interface, wherein the connection manager circuit comprises a processor controlled by software to perform the following operations: reading a destination IP address hardcoded onto the connection manager circuit board, receiving a compact representation of an event of interest from the reference select & meta-tagger circuit, preparing packets with the destination IP address containing the compact representation, opening a client session with the destination IP address, and transmitting the packet as a client to a server at the destination IP address.

A point of recordation terminal apparatus is disclosed comprising:

a network interface, the network interface coupled to a network;
an asset & event capture circuit;
a reference selection & meta-tagger circuit;
a bandwidth controller circuit; and
an encryption circuit, whereby captured assets and references are encrypted prior to transmission.

The apparatus further comprises an archive store coupled to the encryption circuit whereby captured assets and references are stored in encrypted form into the archive store.

The encryption circuit is uniquely associated with the specific PORT by cryptographic operation. The encryption circuit indicates the time and date of the event of interest by cryptographic operation on the assets.

A method is disclosed comprising transmitting a reference immediately while storing an asset into the archive store. The method further comprises temporarily storing the transmitted reference and storing it to the archive store in case the transmission fails.

By storing is meant the steps of detecting when the transmission is likely to be possible again and retransmitting the reference.

A point of recordation terminal apparatus is disclosed comprising:
a network interface, the network interface coupled to a network;
an asset & event capture circuit;
a reference selection & meta-tagger circuit;
wherein the network interface comprises a configuration detection circuit whereby it automatically detects and configures its network interface settings.

A method of operating the configuration detection circuit is disclosed comprising sequentially trying the following processes until a working configuration is established: DHCP, static configuration and auto-detection, wherein auto-detection comprises
determining the local addressing scheme;
selecting a host address not detected in the local network, probing the selected address to determine if used, and reselecting if collision is detected; and
sending a prospective transaction on at least one port to each identified hosts on the local network to determine if any act as a gateway, and selecting a host as a gateway if successful.

In an embodiment, determining the local addressing scheme comprises passively listening to network traffic to determine the local addressing scheme and hosts on the networks. In an embodiment, determining the local addressing scheme comprises actively probing the network to determine the local addressing and hosts on the local network.

A point of recordation terminal apparatus is disclosed comprising
a network interface, the network interface coupled to a network;
an asset & event capture circuit;
a reference selection & meta-tagger circuit; and
a connection manager circuit, whereby the connection manager and the network interface establish client sessions to a server at a known location.

Methods of operating the apparatus include without limitation the following independent processes:
establishing an HTTP or HTTPS protocol client session.
receiving commands issued by a server responding to a client.
periodically reestablishing its client connection to a server.
processing a command to quickly reestablish a client connection.

providing status indication for commands currently running in a client connection and for commands recently completed in a client connection; and other methods for operating the apparatus known in the art.

CONCLUSION

The present invention is distinguished from conventional video surveillance systems by using a public network enabled by its bandwidth controller and encryption circuits, by providing for low bandwidth reference transmission in near real time while queuing multi-frame assets for policy controlled transmission, and policy controlled bandwidth control in response to recovery, normal operation, streaming, and searching.

The present invention is distinguished from conventional cameras by determining if motion has occurred within a period, creating at least one reference indicative of the motion, transmitting the references in real time, and only storing, analyzing, or uploading data around times of motion to reduce bandwidth consumption. In particular, the invention allows efficient and secure use of cloud computing. By encrypting assets and references on a per PORT and per user basis and not decrypting them during upload and storage, the security and providence of the data is assured even when using resources shared across many different companies. The PORT is distinguished from convention video cameras by using only outbound network connections compatible with a wide area network to establish connection with a POA. It is particularly pointed out and distinctly claimed that a network can connect using a cellular network as the back haul as the disclosed bandwidth utilization model makes it practical and affordable (since cellular bandwidth is very expensive compared to landline/wi-fi).

Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for operating an apparatus for to reliably maintain high complexity continuous data over a low bandwidth and unreliable connection, the apparatus comprising:
a point of recordation terminal (PORT) coupled to
a connection, the method comprising
capturing, and
transmitting, an event of interest, wherein capturing an event of interest comprises the following processes:
determining when an event of interest occurs;
selecting an extent of data associated with the event of interest;
efficiently recording the selected extent of data;
deriving a compact representation of the event of interest; and
storing the recorded events; wherein transmitting an event of interest comprises the following processes:
transmitting immediately when directed and
storing if immediate transmission fails;
opening an https client session;
opening an https server session;
connecting between an https client and server;
transmitting with link level encryption;
storing recorded events of interest locally; and
transmitting when an acceptable amount of bandwidth becomes available.

2. A point of recordation terminal comprising:
a high resolution digital camera;
a first storage device;
a first network interface;
a circuit controlled by software to signal a motion threshold;
a circuit controlled by software to measure motion activity;
a circuit controlled by software to track motion objects with analysis artifacts;
a circuit controlled by software to encode h(dot)264 format files;
a circuit controlled by software to encode JPEG files;
a circuit to write to non-volatile removable memories;
a circuit to generate thumbs, timestamps, and motion metadata;
a circuit controlled by software to determine if multiple events of interest occur in close proximity;
a circuit controlled by software to cause a single extent of data to be recorded indicative of multiple event representations and where they occur; and
a circuit controlled by software to store assets locally on the first storage device and to retry transmission at a later time wherein a circuit comprises a processor controlled by software instructions and the processor is coupled to the first network interface, the processor is coupled to the first storage device, and the processor is coupled to the high resolution digital camera.

3. An apparatus comprising:
a point of recordation terminal (PORT) coupled to a connection, said PORT comprising:
an asset & event capture circuit;
a reference select & meta-tagger circuit;
a formatting circuit;
an archive store;
a network interface;
a bandwidth control circuit;
an upload management circuit;
an encryption circuit;
a connection management circuit; the reference select & meta-tagger circuit coupled to the asset and event capture circuit and coupled to the formatting circuit, the archive store coupled to the formatting circuit and to the upload management circuit, the encrypt circuit coupled to the formatting circuit and to the archive store, the network interface coupled to the connection management circuit and to the bandwidth control circuit;
a policy store, the policy store coupled to the connection management circuit, the policy store coupled to the bandwidth control circuit, the policy store coupled to the asset & event capture circuit, the policy store coupled to the reference select & meta-tagger circuit, and the policy store coupled to the upload management circuit.

4. A method for operating an apparatus for to reliably maintain high complexity continuous data over a low bandwidth and unreliable connection, the apparatus comprising:
a point of recordation terminal (PORT) coupled to a connection, the method comprising:
capturing an event of interest, wherein capturing an event of interest comprises the following processes;
determining a start of an event of interest;
recording data associated with the event of interest;
deriving a compact representation of the event of interest;
recording the compact representation of the event of interest;
determining an end of the event of interest;
stopping recording data;

transmitting an event of interest, wherein transmitting an event of interest comprises the following processes:
opening a client session to a server;
transmitting the recorded compact representation of the event immediately; and
storing recorded events of interest locally for later transmission; wherein capturing an event of interest further comprises:
reading a policy from a policy store;
determining the triggers which cause certain actions and when triggered:
setting thresholds for event determination;
selecting data for association with an event of interest to be recorded;
setting parameters for deriving a compact representation; and
setting resolutions for deriving compact representation.

5. A method for operating an apparatus for to reliably maintain high complexity continuous data over a low bandwidth and unreliable connection, the apparatus comprising:
a point of recordation terminal (PORT) coupled to a connection, the method comprising:
capturing an event of interest, wherein capturing an event of interest comprises the following processes
determining a start of an event of interest;
recording data associated with the event of interest;
deriving a compact representation of the event of interest;
recording the compact representation of the event of interest;
determining an end of the event of interest;
stopping recording data;
transmitting an event of interest wherein transmitting an event of interest comprises the following processes:
opening a client session to a server,
transmitting the recorded compact representation of the event immediately, and
storing recorded events of interest locally for later transmission; wherein transmitting the recorded compact representation of the event comprises the steps following:
storing the compact representation of the event in the archive store of the PORT for later transmission if immediate transmission fails and
detecting that immediate transmission has failed.

6. The method of claim 5 wherein transmitting further comprises:
reading a policy from a policy store;
determining the triggers which cause certain actions and when triggered:
setting a rate for immediate transmission;
setting a rate for later transmission;
initiating an upload of a specific recorded event; and
overwriting stored recorded events with new recorded events or discarding new recorded events.

7. The method of claim 6 further comprising:
transmitting accumulated compact representations from the archive store of the PORT; and
detecting when connectivity has been restored.

8. The method of claim 7 wherein transmitting accumulated compact representations comprises:
transmitting accumulated recorded compact representations at a limited rate determined by reading a policy store.

9. An apparatus comprising:
a digital camera coupled to
a reference select & meta-tagger circuit coupled to
a formatting circuit coupled to
a connection manager circuit coupled to
a network interface, wherein the connection manager circuit comprises a processor controlled by software to perform the following operations:
reading a destination Internet Protocol (IP) address hardcoded onto the connection manager circuit board;
receiving a compact representation of an event of interest from the reference select & meta-tagger circuit;
preparing packets with the destination IP address containing the compact representation;
opening a client session with the destination IP address; and
transmitting the packet as a client to a server at the destination IP address.

* * * * *